US008545782B1

(12) United States Patent
Tsujiuchi et al.

(10) Patent No.: US 8,545,782 B1
(45) Date of Patent: Oct. 1, 2013

(54) $CO_2$ RECOVERY APPARATUS AND $CO_2$ RECOVERY METHOD

(71) Applicant: Mitsubishi Heavy Industries, Ltd., Tokyo (JP)

(72) Inventors: Tatsuya Tsujiuchi, New York, NY (US); Shintaro Honjo, New York, NY (US); Takahito Yonekawa, New York, NY (US); Satoru Sugita, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/652,713

(22) Filed: Oct. 16, 2012

(51) Int. Cl.
*B01D 53/62* (2006.01)
*B01D 53/78* (2006.01)

(52) U.S. Cl.
USPC .......... 423/220; 423/228; 422/168; 422/169; 422/170; 422/171; 422/172; 96/234; 96/243; 95/235; 95/236

(58) Field of Classification Search
USPC .......... 423/220, 228; 422/168–172; 95/235, 95/236; 96/234, 243
See application file for complete search history.

(56) References Cited

U.S. PATENT DOCUMENTS

| 5,904,908 | A  | * | 5/1999 | Suzuki et al. | 423/228 |
| 6,579,508 | B2 | * | 6/2003 | Ishida | 423/220 |
| 6,689,332 | B1 | * | 2/2004 | Yoshida et al. | 423/220 |
| 7,374,734 | B2 | * | 5/2008 | Grossman et al. | 423/220 |
| 7,867,322 | B2 | * | 1/2011 | Gal | 95/199 |
| 8,147,593 | B2 | * | 4/2012 | Mimura et al. | 95/235 |

FOREIGN PATENT DOCUMENTS

| JP | 10-033938 A | 2/1998 |
| JP | 2011-115724 A | 6/2011 |
| WO | 2010-102877 A1 | 9/2010 |

* cited by examiner

*Primary Examiner* — Timothy Vanoy
(74) *Attorney, Agent, or Firm* — Westerman, Hattori, Daniels & Adrian, LLP

(57) ABSTRACT

A $CO_2$ recovery apparatus includes a desulfurization tower which includes a desulfurization unit and a cooling unit, an absorption tower which includes a $CO_2$ absorption unit and an acid washing unit, a regeneration tower, and an acid water production device configured to produce acid water by causing exhaust gas yet to be introduced into the desulfurization to come into contact with water. In the $CO_2$ recovery apparatus, the water to be come in contact with the exhaust gas is condensed water that is generated in the desulfurization tower, the absorption tower, or the regeneration tower.

7 Claims, 3 Drawing Sheets

$CO_2$ RECOVERY APPARATUS AND $CO_2$ RECOVERY METHOD

BACKGROUND OF THE INVENTION

1. Field of the Invention

The present invention relates to a $CO_2$ recovery apparatus and a $CO_2$ recovery method. More specifically, the present invention relates to a $CO_2$ recovery apparatus and a $CO_2$ recovery method configured to reduce the concentration of basic amine compounds, which remain in decarbonated exhaust gas from which $CO_2$ has been removed by gas-liquid contact with an absorbing solution and which is released.

2. Description of the Related Art

The greenhouse effect that occurs due to the release of $CO_2$ into the air has been considered as one of the causes of global warming. The need to address global warming has become urgent. The source of generating $CO_2$ ranges in all fields of human activities that utilize burning of fossil fuels. The demand for suppressing exhaust of gas containing $CO_2$ has become more and more intense. Under such circumstances, $CO_2$ recovery technologies for the thermal power plants which use a lot of fossil fuels, such as the method a amine-based absorbents contact with the flue gas and remove $CO_2$ from the gas, are investigated In recovering $CO_2$ from exhaust gas by using the amine-based absorbing solution described above, an amine compound may be entrained in the treated gas from which $CO_2$ has been recovered. In order to prevent air pollution that may occur due to the amine compound entrained in the exhaust gas, it is necessary to reduce the amount of amine compounds to be released together with the decarbonated exhaust gas.

JP H10-33938 A discloses a method for collecting an amine compound. More specifically, in the method discussed in JP H10-33938 A, the distributed sulfuric acid is distributed in order to react with entrained amines in the treated gas and make the basic amine sulfate. Subsequently, the treated gas containing the basic amine sulfate is passed through a demister. In this manner, the conventional method collects a basic amine sulfate from the treated gas.

For a $CO_2$ absorption apparatus having the configuration described above, it is desired to reduce the concentration of a basic amine compound that derives from the $CO_2$ absorbing solution entrained in the exhaust gas to a level that is as low as possible. In particular, $CO_2$ recovery plants for the thermal power plant will treated a lot of the flue gas and the entrained amine amount with the flue gas will tend to increase. Further reduction of the entraine amine amount is required.

JP 2011-115724 A discloses a method for further reducing the concentration of components of an absorbing solution. More specifically, JP 2011-115724 A discloses a $CO_2$ recovery apparatus which includes an absorption tower including a $CO_2$ absorption unit configured to absorb $CO_2$ contained in exhaust gas into a basic amine compound absorbing solution by causing the exhaust gas to come into contact with the basic amine compound absorbing solution and at least one washing unit configured to remove basic amine compounds entrained in the decarbonated exhaust gas by causing the decarbonated exhaust gas from which $CO_2$ has been removed by the $CO_2$ absorption unit to come into contact with washing water. The conventional $CO_2$ recovery apparatus further includes an acid washing unit, which is provided downstream in the direction of the flow of the decarbonated exhaust gas in the washing unit and which is configured to further remove basic amine compounds entrained in the decarbonated exhaust gas by causing the decarbonated exhaust gas to come into contact with circulating acid water. The $CO_2$ recovery apparatus is capable of further reducing the concentration of the components of the absorbing solution, which remain in decarbonated exhaust gas and which is to be released together with the decarbonated exhaust gas.

SUMMARY OF THE INVENTION

In using a $CO_2$ recovery apparatus which includes an acid washing unit, in order to remove basic amine compounds from exhaust gas, acid water containing sulfuric acid, for example, is purchased to cause decarbonated exhaust gas to come into contact with the acid water and is supplied to the $CO_2$ recovery apparatus. The acid water used for removing the basic amine compound is to be drained. More specifically, the acid water, which is out of process-water, is to be drained in addition to draining process water. Therefore, the total amount of water to be drained may increase.

In order to solve the above-described problem, the present invention is directed to provide a $CO_2$ recovery apparatus which is capable of reducing costs and the total amount of water to be drained and which includes an acid washing unit and a $CO_2$ recovery method therefor.

In order to achieve the above-described purpose of the present invention, in an aspect of the present invention, a $CO_2$ recovery apparatus includes a desulfurization tower which includes a desulfurization unit configured to remove a sulfur content contained in exhaust gas, and a cooling unit configured to cool desulfurized exhaust gas, from which the sulfur content has been removed by the desulfurization unit, by using cooling water, an absorption tower which includes a $CO_2$ absorption unit configured to absorb $CO_2$ contained in the desulfurized exhaust gas, from which the sulfur content has been removed by the desulfurization tower, into a basic amine compound absorbing solution by causing the desulfurized exhaust gas to come into contact with the basic amine compound absorbing solution, a washing unit configured to wash decarbonated exhaust gas, from which $CO_2$ has been removed by the $CO_2$ absorption unit, by causing the decarbonated exhaust gas to come into contact with washing water, and an acid washing unit configured to remove a basic amine compound entrained in the decarbonated exhaust gas, from which $CO_2$ has been absorbed by the $CO_2$ absorption unit, by causing the decarbonated exhaust gas to come into contact with acid water, and a regeneration tower configured to emit $CO_2$ gas and is configured to regenerate the absorbing solution with heating to separate and subsequently remove $CO_2$ from the absorbing solution, and an acid water production device configured to produce the acid water by causing the exhaust gas yet to be introduced into the desulfurization unit to come into contact with water. In the $CO_2$ recovery apparatus, the water to come into contact with the exhaust gas is condensed water generated by the desulfurization tower, the absorption tower, or the regeneration tower.

In addition, in an aspect of the present invention, a $CO_2$ recovery method includes desulfurizing exhaust gas by removing a sulfur content contained in exhaust gas, cooling the exhaust gas, absorbing $CO_2$ contained in desulfurized exhaust gas, from which the sulfur content has been removed by the desulfurizing, into a basic amine compound absorbing solution by causing the desulfurized exhaust gas to come into contact with the basic amine compound absorbing solution, regenerating the absorbing solution with heating to separate and subsequently remove $CO_2$ from the absorbing solution, and by emitting $CO_2$ gas, washing the decarbonated exhaust gas, from which $CO_2$ has been removed by the absorbing of $CO_2$, by causing the decarbonated exhaust gas to come into contact with washing water, removing a basic amine compound entrained in the decarbonated exhaust gas, which has been washed by the washing, from the exhaust gas by causing the decarbonated exhaust gas to come into contact with acid water, and producing the acid water by causing the exhaust gas yet to be introduced into the desulfurizing to come into contact with condensed water that is generated by the desulfurizing, the cooling, the absorbing of $CO_2$, the regenerating, or the washing.

In an aspect of the present invention, by producing acid water made of sulfides contained in exhaust gas yet to be desulfurized and cooling water in process as its materials, the costs for purchasing acid water and the total amount of water to be drained can be reduced.

DESCRIPTION OF THE EMBODIMENTS

Figure 1:
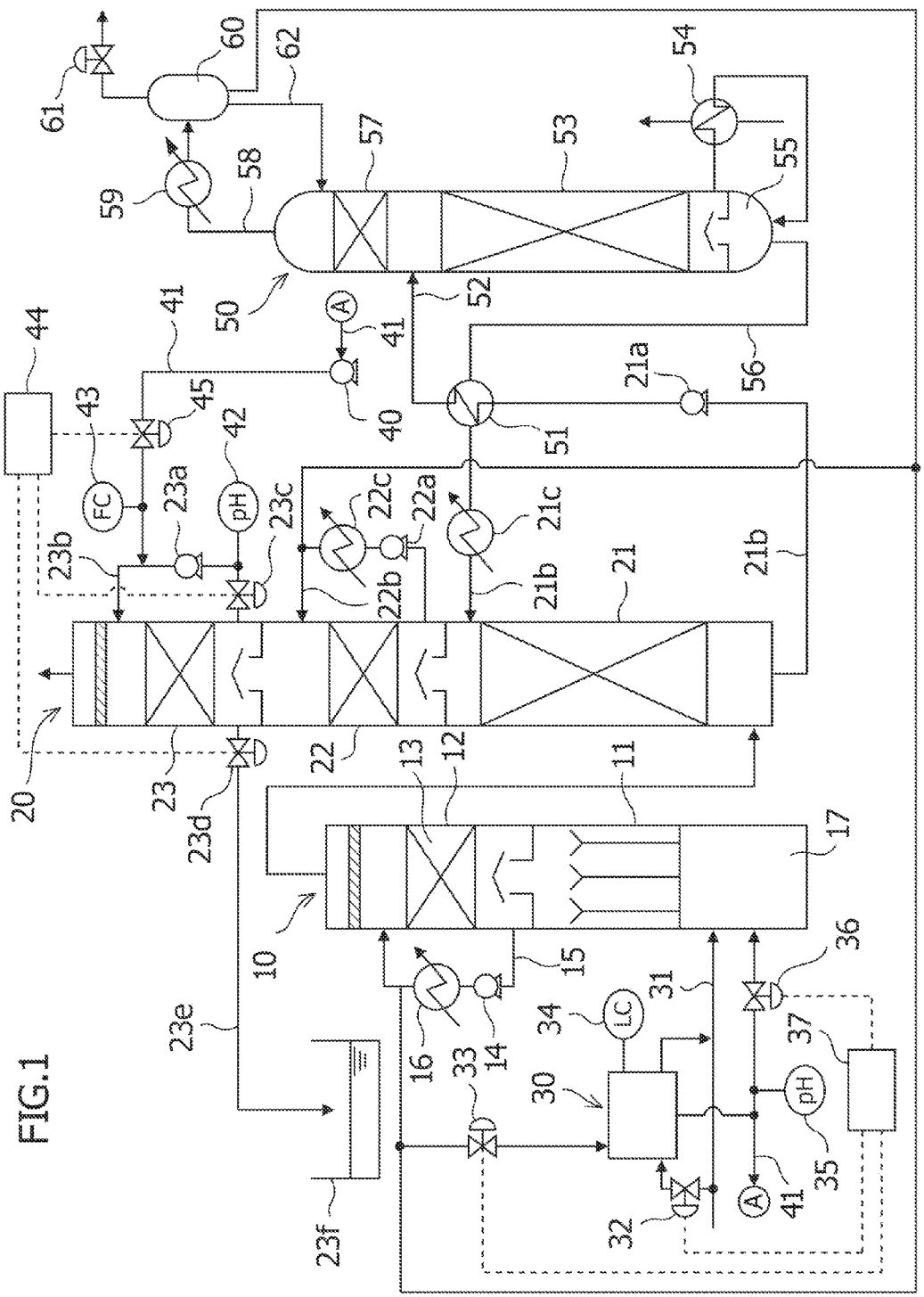
FIG. 1 is a schematic view which illustrates an example of a $CO_2$ recovery apparatus according to an exemplary embodiment of the present invention.

Hereinbelow, a general configuration of a $CO_2$ recovery apparatus and a $CO_2$ recovery method according to an exemplary embodiment of the present invention will be described in detail. Note that the present invention is not limited to the exemplary embodiment to be described below. In addition, components of the exemplary embodiment described below include components that a person skilled in the art can easily replace with those described below and components that are substantially the same as those described below.

The $CO_2$ recovery apparatus according to the present invention includes, as its basic configuration, a desulfurization tower, an absorption tower, a regeneration tower, and an acid water production device. The desulfurization tower at least includes a desulfurization unit and a cooling unit. The desulfurization unit is configured to remove a sulfur content from exhaust gas. The cooling unit is configured to cool decarbonated exhaust gas, from which the sulfur content has been removed by the desulfurization unit, by using cooling water. If the temperature of the exhaust gas to be desulfurized is high, the efficiency of absorbing $CO_2$ becomes low. Accordingly, the exhaust gas to be desulfurized can be cooled by the cooling unit before causing the exhaust gas to be desulfurized to come into contact with the absorbing solution.

The absorption tower at least includes a $CO_2$ absorption unit, a washing unit, and an acid washing unit. The $CO_2$ absorption unit is configured to absorb $CO_2$ contained in the exhaust gas to be desulfurized into a basic amine compound absorbing solution by causing the desulfurized exhaust gas, from which the sulfur contents have been removed by the desulfurization tower, to come into contact with the basic amine compound absorbing solution. The washing unit is configured to cleanse decarbonated exhaust gas by causing the decarbonated exhaust gas, from which $CO_2$ has been removed by the $CO_2$ absorption unit, to come into contact with washing water. By washing the decarbonated exhaust gas, the washing unit can remove the basic amine compound absorbing solution entrained in the decarbonated exhaust gas. The acid washing unit is configured to remove a basic amine compound entrained in decarbonated exhaust gas, from which $CO_2$ has been absorbed by the $CO_2$ absorption unit, from the exhaust gas by causing the decarbonated exhaust gas to come into contact with acid water.

The regeneration tower is configured to emit $CO_2$ gas and is configured to regenerate the absorbing solution with heating to separate and subsequently remove $CO_2$ from the absorbing solution.

The $CO_2$ recovery apparatus according to the present invention is equipped with an acid water production device, which is configured to produce the acid water by causing the exhaust gas yet to be introduced into the desulfurization apparatus to come into contact with water. By using the acid water production device, acid water can be produced by using a sulfide contained in the exhaust gas yet to be desulfurized as its material and by causing the sulfide to come into contact with water. With the acid water production device, costs for purchasing acid water can be reduced. For example, for the acid water production device, a scrubber, a packed tower, a jet valve reactor, or the like, can be used.

Condensed water generated by the desulfurization tower, the absorption tower, or the regeneration tower is used as the water with which the exhaust gas is caused to contact. By using the condensed water, because it is not necessary to supply water from outside the system of the desulfurization tower in producing acid water, the total amount of water to be drained can be reduced.

The acid water production device can be provided in the desulfurization tower. By providing the acid water production device in the desulfurization tower, the area for installing the acid water production device can be reduced.

The $CO_2$ recovery apparatus according to the present invention can be equipped with a sulfuric acid replenishing tank, which is configured to add sulfuric acid to the acid water. If the amount of the sulfide contained in the exhaust gas or the amount of cooling water is small, the acid water production device cannot produce a sufficiently large amount of water for removing the basic amine compound. In this case, if the sulfuric acid replenishing tank is provided, the acid water can be supplied in a sufficient amount for the neutralization of the basic amine compound.

In addition, the $CO_2$ recovery apparatus according to the present invention can further include a water level sensor configured to measure the water level of the acid water in the acid water production device, a pH sensor configured to measure a pH value of the acid water, and a control unit configured to control the pH value and the water level of the acid water by executing adjustment among the amounts of the exhaust gas and the condensed water to be supplied to the acid water production device and the water to be drained from the acid water production device according to the measurement values measured by the water level sensor and the pH sensor. The $CO_2$ recovery apparatus according to the present invention can include the above-described sensors and the control unit because with the above-described sensors and control unit, the $CO_2$ recovery apparatus can manage the production of acid water.

In addition, the $CO_2$ recovery apparatus according to the present invention can further include a pH sensor configured to measure the pH value of the acid water circulating in the acid washing unit, a flow sensor configured to measure the flow rate of the acid water to be supplied to the acid washing unit, and a second control unit configured to control the pH value and the flow rate of the acid water with which the decarbonated exhaust gas is caused to contact by adjusting the flow rate of the acid water to be supplied to the acid washing unit according to a measurement value measured by the pH sensor. The $CO_2$ recovery apparatus according to the present invention can further include the above-described pH sensor, flow sensor, and the second control unit because with the above-described pH sensor, flow sensor, and the second control unit, the $CO_2$ recovery apparatus can supply the acid water in an amount large enough to remove the basic amine compound to the acid washing unit with least wasted acid water.

The $CO_2$ recovery apparatus according to the present invention can include additional facilities in addition to the desulfurization tower, the absorption tower, the regeneration tower, and the acid water production device, which are provided as the basic configuration of the $CO_2$ recovery apparatus.

Now, an exemplary method for recovering $CO_2$ according to the present invention will be described in detail below. The $CO_2$ recovery method according to the present invention at least includes a desulfurization step, a cooling step, a $CO_2$ absorption step, a regeneration step, a washing step, a removal step, and an acid water production step.

The desulfurization step is a step for removing a sulfur content contained in the exhaust gas. The cooling step is a step for cooling the desulfurized exhaust gas, from which the sulfur content has been removed by the desulfurization step, by using cooling water. The amine compound contained in the basic amine compound absorbing solution may be degraded by the heat, and CO2 absorbing efficiency is decreased. Accordingly, if the temperature of the desulfurized exhaust gas is high, the desulfurized exhaust gas can be cooled by the cooling step before the desulfurized exhaust gas is caused to come into contact with the absorbing solution.

The $CO_2$ absorption step is a step for absorbing $CO_2$ contained in the desulfurized exhaust gas, from which the sulfur content has been removed by the desulfurization step, into a basic amine compound absorbing solution by causing the desulfurized exhaust gas to come into contact with the basic amine compound absorbing solution.

The regeneration step is a step for regenerating the absorbing solution so that the basic amine compound absorbing solution can absorb $CO_2$ with heating to separate and subsequently remove $CO_2$ from the absorbing solution, and emitting $CO_2$ gas.

The washing step is executed between the $CO_2$ absorption step and the removal step. More specifically, the washing step is a step for cleansing the decarbonated exhaust gas, from which $CO_2$ has been removed by the $CO_2$ absorption step, by causing the decarbonated exhaust gas to come into contact with washing water. By executing the washing step, the basic amine compound absorbing solution entrained in the decarbonated exhaust gas can be removed.

The removal step is a step for removing the basic amine compound entrained in the decarbonated exhaust gas, from which $CO_2$ has been removed by the $CO_2$ absorption step, from the exhaust gas by causing the decarbonated exhaust gas to come into contact with acid water.

The acid water production step is a step for producing the acid water by causing the exhaust gas yet to be introduced into the desulfurization step with the condensed water generated by the desulfurization step, the cooling step, the $CO_2$ absorption step, or the regeneration step. By executing the acid water production step, acid water can be produced by using a sulfide contained in the exhaust gas yet to be desulfurized as its material and by causing the sulfide to come into contact with the condensed water. Furthermore, by executing the acid water production step, costs for purchasing acid water can be reduced.

The $CO_2$ recovery method according to the present invention can include a sulfuric acid addition step for adding sulfuric acid to the acid water. The sulfuric acid addition step can be executed before the above-described processing steps. If the amount of the sulfide contained in the exhaust gas or the amount of cooling water is small, a sufficiently large amount of water for removing the basic amine compound cannot be produced by the acid water production step. In this case, by adding sulfuric acid by the sulfuric acid addition step, acid water can be supplied in an amount large sufficient to remove the basic amine compound.

In the $CO_2$ recovery method according to the present invention, the acid water production step can include a step for measuring the amount of the acid water, a step for measuring the pH value of the acid water, and a step for adjusting the amount and the pH value of the acid water by controlling the contact between the exhaust gas and the water according to measurement values for the amount and the pH value of the acid water. By executing the acid water production step including the acid water amount measurement step, the acid water pH value measurement step, and the acid water amount and pH value adjustment step, the present invention can manage the production of acid water.

In the $CO_2$ recovery method according to the present invention, the removal step can include a circulation step for causing decarbonated exhaust gas to come into contact with circulated acid water, a step for measuring the pH value of the circulated acid water, a step for supplying new acid water to the circulated acid water according to the measurement value of the pH value, a step for measuring the amount of the new acid water to be supplied, and a step for controlling the amount of the new acid water to be supplied with the measurement value of the pH value. By executing the removal step which includes the steps described above, the acid water in an amount large enough to remove the basic amine compound can be made in contact with the decarbonated exhaust gas with least wasted acid water.

The $CO_2$ recovery method according to the present invention can include additional steps in addition to the desulfurization step, the cooling step, the $CO_2$ absorption step, the regeneration step, the removal step, and the acid water production step.

Now, an exemplary embodiment of the present invention will be described in detail below with reference to the attached drawings. Note that the present invention is not limited to the examples illustrated in FIGS. 1 through 3.

FIG. 1 is a schematic view which illustrates an example of the $CO_2$ recovery apparatus according to the present exemplary embodiment. Referring to FIG. 1, the $CO_2$ recovery apparatus includes a desulfurization tower 10, an absorption tower 20, a regeneration tower 50, and an acid water production device 30 as a basic configuration thereof.

The desulfurization tower 10 includes a desulfurization apparatus 11 and a cooling device 12. The desulfurization apparatus 11 is configured to remove a sulfur content contained in the exhaust gas. For a method of removing a sulfur content that uses the desulfurization apparatus 11, a method for absorbing and removing sulfur dioxide ($SO_2$) gas by causing the exhaust gas to come into contact with limestone slurry, which has been prepared by suspending limestone ($CaCO_3$) in water, can be used.

The cooling device 12 is configured to cool the decarbonated exhaust gas, from which the sulfur content has been removed by the desulfurization apparatus 11, by using cooling water. In order to improve the efficiency of absorbing $CO_2$ by using the absorption tower 20, the cooling device 12 cools the desulfurized exhaust gas. The desulfurized exhaust gas comes in contact with the cooling water in a cooling unit 13. When the desulfurized exhaust gas is cooled by the cooling water, entrained steam condenses. The condensed water and the cooling water is drained from the cooling unit 13. After being drained, the condensed water is conveyed by a cooling water circulation pump 14 onto the top portion of the cooling unit 13 via a cooling water pipe 15. While the drained condensed water is being conveyed, the condensed water and the used cooling water is cooled by a cooler 16. The water cooled by the cooler 16 is used again as the cooling water to cool new desulfurized exhaust gas.

The absorption tower 20 includes a $CO_2$ absorption unit 21, a washing unit 22, and an acid washing unit 23. The $CO_2$ absorption unit 21 is configured to absorb $CO_2$ contained in the desulfurized exhaust gas, which has been cooled by the desulfurization tower 10, into the basic amine compound absorbing solution by causing the cooled desulfurized exhaust gas to come into contact with the basic amine compound.

After coming in contact with the desulfurized exhaust gas, the basic amine compound absorbing solution is drained from the $CO_2$ absorption unit 21. The drained basic amine compound absorbing solution is conveyed by an absorbing solution circulation pump 21a into the regeneration tower 50 via an absorbing solution pipe 21b.

The washing unit 22 is configured to cleanse the decarbonated exhaust gas by causing the decarbonated exhaust gas, from which $CO_2$ has been removed by the $CO_2$ absorption unit 21, to come into contact with washing water.

After coming into contact with the decarbonated exhaust gas, the washing water, which has now become condensed water, is drained from the washing unit 22. The drained condensed water is conveyed by a washing water circulation pump 22a to a top portion of the washing unit 22 via a washing water pipe 22b. While the drained condensed water is being conveyed by the washing water circulation pump 22a, the condensed water is cooled by a cooler 22c. Furthermore, the cooled condensed water is used as washing water to cleanse new decarbonated exhaust gas. On the other hand, a part of the condensed water is fed into the acid water production device 30.

The acid washing unit 23 is configured to neutralize the basic amine compound entrained in the decarbonated exhaust gas by causing the decarbonated exhaust gas, which has been cleansed by the washing unit 22, to come into contact with the acid water.

After coming into contact with the decarbonated exhaust gas washed by the washing unit 22, the acid water is drained from the acid washing unit 23. The drained acid water is conveyed by an acid water circulation pump 23a to a top portion of the acid washing unit 23 via an acid water pipe 23b. Furthermore, the acid water is caused to contact new decarbonated exhaust gas. After the acid water is circulated and used repeatedly, the acid water which has neutralized the basic amine compound to a near saturation state is drained into a drained water processing unit 23f via a drain pipe 23e by opening a valve 23c.

The acid water production unit 30 produces acid water by causing exhaust gas yet to be introduced into the desulfurization tower 10 to come into contact with condensed water in the cooling device 12, the washing unit 22, or a separation device 60. The exhaust gas is introduced into the desulfurization apparatus 10 by a gas introduction pipe 31. A valve 32 is opened to introduce a part of the exhaust gas to be introduced into the desulfurization apparatus 10 into the acid water production device 30. In addition, a valve 33 is opened to introduce the condensed water into the acid water production device 30. A water level sensor 34 is configured to measure the amount of the acid water in the acid water production device 30. A pH sensor 35 is configured to measure the pH value of the acid water. The valves 32 and 33 are opened or closed according to the amount and the pH value of the acid water measured by the sensors 34 and 35 to control the amount and the pH value of the acid water. In addition, excessive acid water, if any, can be introduced into a limestone slurry tank 17, which is included in the desulfurization apparatus 11, by opening a valve 36. A control unit 37 executes the control of the amount and the pH value of the acid water and the introduction of the excessive acid water into the limestone slurry tank 17.

The acid water produced by the acid water production device 30 is supplied by an acid water transport pump 40 into the acid water pipe 23b via an acid water transport pipe 41. The pH value of the acid water circulating in the acid washing unit 23 is measured by a pH sensor 42. In addition, the flow rate of the acid water to be supplied into the acid water pipe 23b is measured by a flow sensor 43. By adjusting the flow rate of the acid water to be supplied into the acid water pipe 23b according to the measurement value measured by the pH sensor 42, the opening and closing of the valve 23c and a valve 45 is controlled to control the pH value and the supply amount of the acid water to be made in contact with the decarbonated exhaust gas. A control unit 44 executes the control of the pH value and the flow rate of the acid water and the control of operations for opening and closing a valve 23d, which is executed to drain the water.

The regeneration tower 50 is a facility for regenerating the basic amine compound absorbing solution that has absorbed $CO_2$ so that the basic amine compound absorbing solution can absorb $CO_2$ by releasing $CO_2$ from the basic amine compound absorbing solution that has absorbed $CO_2$. The basic amine compound absorbing solution that has absorbed $CO_2$ is transported by the absorbing solution circulation pump 21a into the regeneration tower 50 from the absorbing solution pipe 21b via the heat exchanger 51 and the absorbing solution pipe 52. After the basic amine compound absorbing solution is transported into the regeneration tower 50, heat is applied by a reboiler 54 to the basic amine compound absorbing solution while the basic amine compound absorbing solution passes through a lower portion filling layer 53. The reboiler 54 is connected to a lower portion of the regeneration tower 50. When the heat is applied, $CO_2$ gas is released from the basic amine compound absorbing solution. Subsequently, the basic amine compound absorbing solution is reserved in a base portion 55 of the regeneration tower 50. After releasing the $CO_2$ gas reserved in the base portion 55, the basic amine compound absorbing solution is supplied into the absorption tower 20 via an absorbing solution pipe 56 and the absorbing solution pipe 21b. While the basic amine compound absorbing solution is being transported into the absorption tower 20, the basic amine compound absorbing solution is cooled by the cooler 21c. Subsequently, the cooled basic amine compound absorbing solution comes into contact with new desulfurized exhaust gas. The released $CO_2$ gas rises inside the regeneration tower 50 and is emitted, through an emission pipe 58, from a top portion of the regeneration tower 50 via an upper portion filling layer 57. At this timing, the $CO_2$ gas to be emitted includes moisture. The moisture contained in the $CO_2$ gas is cooled by a condenser 59. After the $CO_2$ gas is cooled, the moisture becomes condensed water. The condensed water and the $CO_2$ gas are separated from each other by using a separation device 60. The high purity $CO_2$ gas is recovered by opening a valve 61. A part of the condensed water is fed into the acid water production device 30. Alternatively, the part of the condensed water is fed into the regeneration tower 50 via a circulated water pipe 62.

Figure 2:
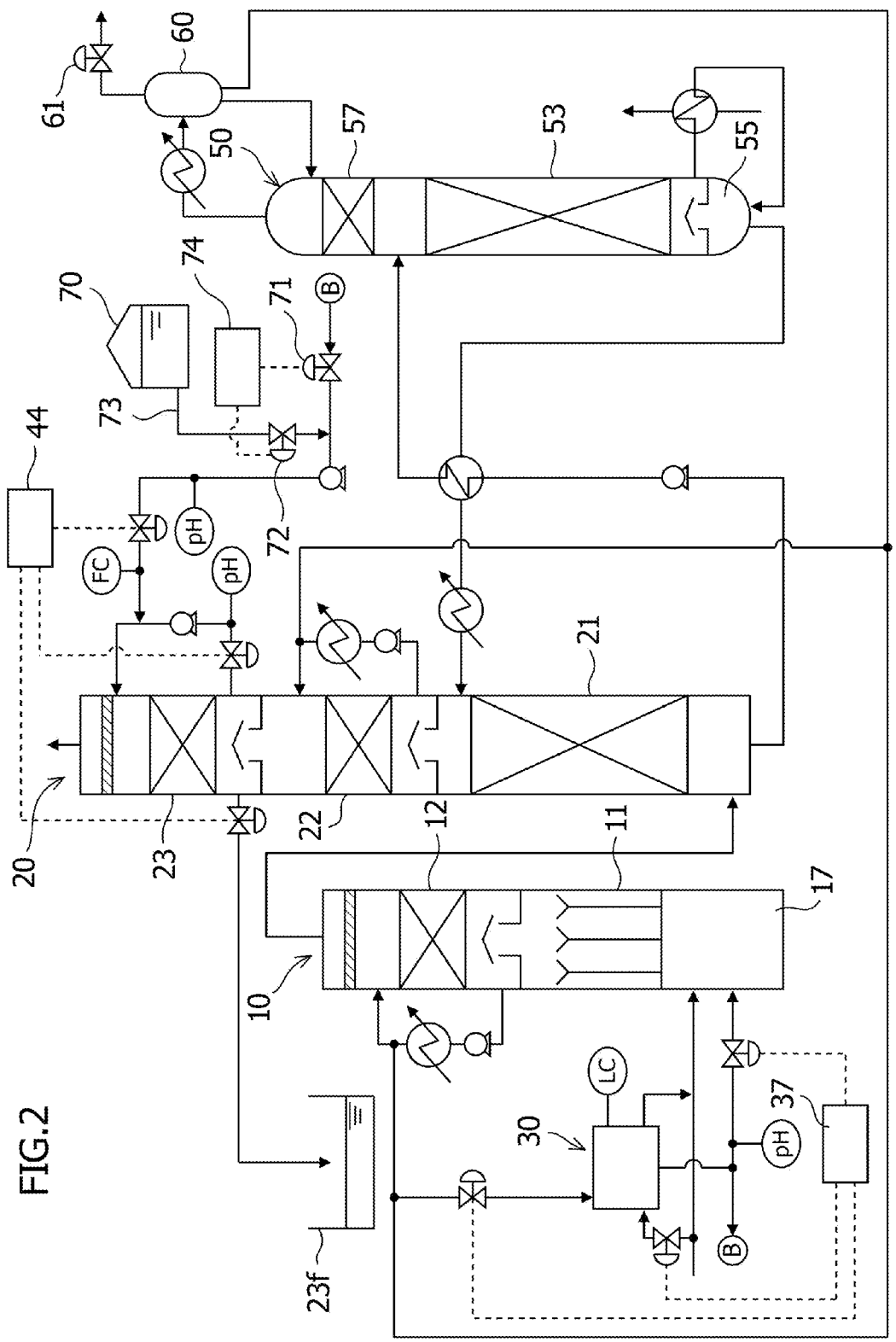
FIG. 2 is a schematic view which illustrates an example of a $CO_2$ recovery apparatus according to an exemplary embodiment of the present invention, which has a configuration different from the configuration of the $CO_2$ recovery apparatus illustrated in FIG. 1.

FIG. 2 is a schematic view which illustrates an example of the $CO_2$ recovery apparatus according to an exemplary embodiment of the present invention, which has a configuration different from the configuration of the example illustrated in FIG. 1. Similar to the example illustrated in FIG. 1, the $CO_2$ recovery apparatus includes the desulfurization tower 10, the absorption tower 20, the regeneration tower 50, and the acid water production device 30 as a basic configuration thereof. The components similar to those of the $CO_2$ recovery apparatus illustrated in FIG. 1 are provided with the same reference numerals and symbols as those provided in FIG. 1 and a detailed description thereof is omitted below. If a large amount of basic amine compounds are entrained in the exhaust gas, a large amount of acid water is to be supplied to the acid washing unit 23. On the other hand, if a small amount of sulfur contents are included in the exhaust gas, the amount of acid water to be produced may be reduced and become small. Accordingly, by adding acid, such as sulfuric acid, to the acid water produced by the acid water production device 30, the acid water of which the pH value is kept low can be supplied to the acid washing unit 23. In the example illustrated in FIG. 2, the $CO_2$ recovery apparatus further includes a sulfuric acid replenishing tank 70. The sulfuric acid replenishing tank 70 is configured to reserve the sulfuric acid to be added to the acid water. If acid water of an amount large enough to remove the basic amine compound cannot be produced by the acid water production device 30 or if the pH value of the acid water produced by the acid water production device 30 is high, a valve 71 is closed while a valve 72 is opened to add sulfuric acid from the sulfuric acid replenishing tank 70 to the acid water via a sulfuric acid introduction pipe 73. A control unit 74 is configured to execute control for opening and closing the valves 71 and 72.

Figure 3:
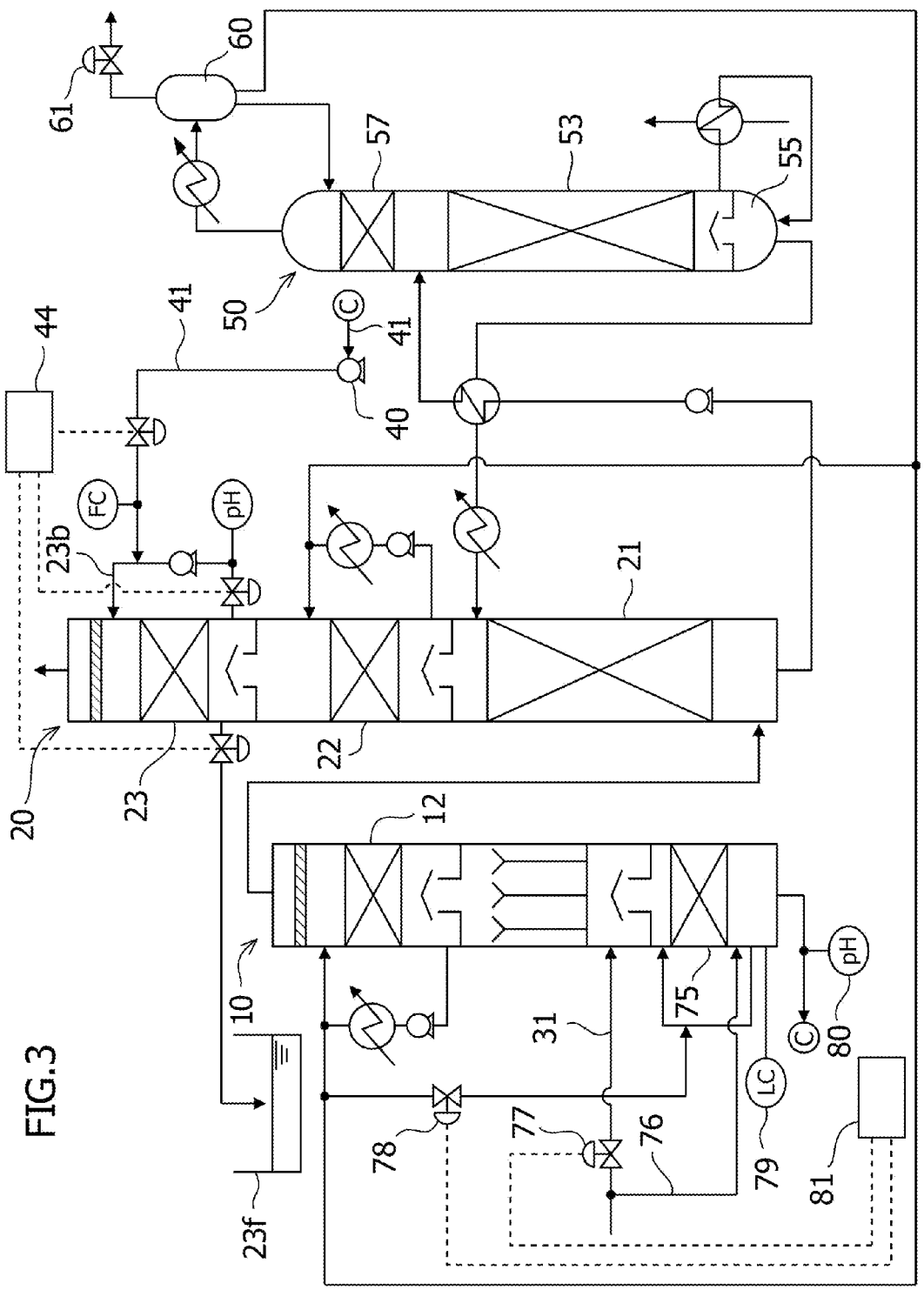
FIG. 3 is a schematic view which illustrates an example of a $CO_2$ recovery apparatus according to an exemplary embodiment of the present invention, which has a configuration different from the configuration of the $CO_2$ recovery apparatus illustrated in FIG. 1 or FIG. 2.

FIG. 3 is a schematic view which illustrates an example of the $CO_2$ recovery apparatus according to an exemplary embodiment of the present invention, which has a configuration different from the configurations of the examples illustrated in FIGS. 1 and 2. Similar to the example illustrated in FIG. 1, the $CO_2$ recovery apparatus includes the desulfurization tower 10, the absorption tower 20, and the regeneration tower 50 as a basic configuration thereof. The components similar to those of the $CO_2$ recovery apparatus illustrated in FIG. 1 are provided with the same reference numerals and symbols as those provided in FIG. 1 and a detailed description thereof is omitted below. In the example illustrated in FIG. 3, the $CO_2$ recovery apparatus includes an acid water production device 75 in the absorption tower 20, as is different from the $CO_2$ recovery apparatuses illustrated in FIGS. 1 and 2.

The acid water production device 75 is configured to produce acid water by dispatching the exhaust gas to be introduced into the desulfurization tower 10 and by causing the dispatched exhaust gas to come into contact with the condensed water in the cooling device 12, the washing unit 22, or the separation device 60. The exhaust gas is introduced by a gas introduction pipe 76 into the acid water production device 75. A valve 77 is closed to introduce a part of the exhaust gas to be introduced into the desulfurization tower 10 into the acid water production device 75. In addition, a valve 78 is opened to introduce the condensed water into the acid water production device 75. A water level sensor 79 is configured to measure the amount of acid water in the acid water production device 30. A pH sensor 80 is configured to measure the pH value of the acid water. By executing control for opening and closing the valves 77 and 78 according to the amount and the pH value of the acid water measured by the water level sensor 79 and the pH sensor 80, the amount and the pH value of the acid water are controlled. A control unit 81 is configured to control the amount and the pH value of the acid water. The acid water produced by the acid water production device 75 is supplied by the acid water transport pump 40 into the acid water pipe 23*b* via the acid water transport pipe 41.

The exemplary embodiment of the present invention is described above. However, the present invention is not limited to the exemplary embodiment described above. More specifically, the present invention can be implemented by various modifications or alterations according to technical ideas of the present invention.

What is claimed is:

1. A $CO_2$ recovery apparatus comprising:
   a desulfurization tower which includes:
      a desulfurization unit configured to remove a sulfur content contained in exhaust gas; and
      a cooling unit configured to cool desulfurized exhaust gas, from which the sulfur content has been removed by the desulfurization unit, by using cooling water;
   an absorption tower which includes:
      a $CO_2$ absorption unit configured to absorb $CO_2$ contained in the desulfurized exhaust gas, from which the sulfur content has been removed by the desulfurization tower, into a basic amine compound absorbing solution by causing the desulfurized exhaust gas to come into contact with the basic amine compound absorbing solution;
      a washing unit configured to wash decarbonated exhaust gas, from which $CO_2$ has been removed by the $CO_2$ absorption unit, by causing the decarbonated exhaust gas to come into contact with washing water; and
      an acid washing unit configured to remove a basic amine compound entrained in the decarbonated exhaust gas, from which $CO_2$ has been absorbed by the $CO_2$ absorption unit, by causing the decarbonated exhaust gas to come into contact with acid water; and
   a regeneration tower configured to emit $CO_2$ gas and configured to regenerate the absorbing solution with heating to separate $CO_2$ and subsequently remove $CO_2$ from the absorbing solution; and
   an acid water production device configured to produce the acid water by causing the exhaust gas yet to be introduced into the desulfurization unit to come into contact with water,
   wherein the water to come into contact with the exhaust gas is condensed water generated by the desulfurization tower, the absorption tower, or the regeneration tower.

2. The $CO_2$ recovery apparatus according to claim 1, wherein the acid water production device is provided in the desulfurization tower.

3. The $CO_2$ recovery apparatus according to claim 1, further comprising:
   a water level sensor configured to measure a water level of the acid water in the acid water production device;
   a pH sensor configured to measure a pH value of the acid water; and
   a control unit configured to control the pH value and the water level of the acid water by controlling exhaust gas and the condensed water to be supplied to the acid water production device and water drained from the acid water production device according to measurement values measured by the water level sensor and the pH sensor.

4. The $CO_2$ recovery apparatus according to claim 1, further comprising:
- a pH sensor configured to measure a pH value of acid water circulating in the acid washing unit;
- a flow sensor configured to measure a flow rate of the acid water to be supplied to the acid washing unit; and
- a control unit configured to control the pH value and the flow rate of the acid water to come into contact with the decarbonated exhaust gas by adjusting the flow rate of the acid water to be supplied to the acid washing unit according to a measurement value measured by the pH sensor.

5. A $CO_2$ recovery method comprising:
- desulfurizing exhaust gas by removing a sulfur content contained in exhaust gas;
- cooling the exhaust gas;
- absorbing $CO_2$ contained in desulfurized exhaust gas, from which the sulfur content has been removed by the desulfurizing, into a basic amine compound absorbing solution by causing the desulfurized exhaust gas to come into contact with the basic amine compound absorbing solution;
- emitting $CO_2$ gas and regenerating the absorbing solution with heating to separate $CO_2$ and subsequently remove $CO_2$ from the absorbing solution;
- washing the decarbonated exhaust gas, from which $CO_2$ has been removed by the absorbing of $CO_2$, by causing the decarbonated exhaust gas to come into contact with washing water;
- removing a basic amine compound entrained in the decarbonated exhaust gas, which has been washed by the washing, from the exhaust gas by causing the decarbonated exhaust gas to come into contact with acid water; and
- producing the acid water by causing the exhaust gas yet to be subjected to the desulfurizing to come into contact with condensed water that is generated by the desulfurizing, the cooling, the absorbing of $CO_2$, the regenerating, or the washing.

6. The $CO_2$ recovery method according to claim 5, wherein the producing of the acid water includes:
- measuring a water level of the acid water;
- measuring a pH value of the acid water; and
- adjusting the water level and the pH value of the acid water by controlling the contact between the exhaust gas and the water according to measurement values for the water level and the pH value of the acid water.

7. The $CO_2$ recovery method according to claim 5, wherein the removing includes:
- circulating the acid water to be made in contact with the decarbonated exhaust gas;
- measuring a pH value of the acid water to be circulated;
- supplying new acid water to the circulated acid water according to a measurement value of the pH value of the acid water;
- measuring an amount of the new acid water to be supplied; and
- controlling the amount of the new acid water to be supplied according to the measurement value of the pH value of the acid water.

* * * * *